United States Patent
Kiener et al.

(10) Patent No.: US 6,986,823 B2
(45) Date of Patent: Jan. 17, 2006

(54) PROCESS AND APPARATUS FOR PRODUCING A LAMINATE, COMPRISING AT LEAST ONE POLYMER FILM WITH INFORMATION AND AT LEAST ONE SUBSTRATE, FOR FURTHER PROCESSING FOR FORGERY-PROOF DOCUMENTS

(75) Inventors: Waldemar Kiener, Lauchheim (DE); Johann Rein, Bopfingen (DE); Harald Hoeppner, Berlin (DE); Thomas Löer, Berlin (DE); Detlef Märtens, Berlin (DE); Michael Radtke, Berlin (DE); Norbert Sengstock, Berlin (DE); Wolfgang Dörner, Berlin (DE); Peter Stiemert, Berlin (DE)

(73) Assignee: Bundesdruckerei GmbH, Berlin (DE)

( * ) Notice: Subject to any disclaimer, the term of this patent is extended or adjusted under 35 U.S.C. 154(b) by 0 days.

(21) Appl. No.: 09/746,732

(22) Filed: Dec. 21, 2000

(65) Prior Publication Data

US 2001/0052387 A1 Dec. 20, 2001

(30) Foreign Application Priority Data

Dec. 22, 1999 (DE) ......................................... 199 62 413

(51) Int. Cl.
*B32B 31/00* (2006.01)

(52) U.S. Cl. ..................... 156/249; 156/275.7; 156/344

(58) Field of Classification Search ................. 156/247, 156/249, 273.3, 275.5, 275.7, 344, 379.8; 430/10; 283/75, 77, 86
See application file for complete search history.

(56) References Cited

U.S. PATENT DOCUMENTS

| 3,822,838 A | * | 7/1974 | Butler et al. | ............. 242/417.2 |
| 4,389,472 A | * | 6/1983 | Neuhaus et al. | ......... 156/275.5 |
| 5,755,919 A | * | 5/1998 | Ueda et al. | ............... 156/379.8 |

FOREIGN PATENT DOCUMENTS

EP          726142 A2  *  8/1996

* cited by examiner

*Primary Examiner*—Jeff H. Aftergut
*Assistant Examiner*—John L. Goff

(57) ABSTRACT

A process and an apparatus for producing a laminate, comprise at least one polymer film with information and at least one substrate, for further processing for forgery-proof documents, in which, in the first processing station, a supporting film is delaminated on a first side of the polymer film, after which a substrate is laminated on by an adhesive and subsequently exposed to a crosslinking-active radiation, and in which a laminate led out from the first processing station is fed to a second processing station, and the supporting film is delaminated on a second side of the laminate, after which a substrate is laminated on by an adhesive and subsequently exposed to a crosslinking-active radiation.

11 Claims, 2 Drawing Sheets

PROCESS AND APPARATUS FOR PRODUCING A LAMINATE, COMPRISING AT LEAST ONE POLYMER FILM WITH INFORMATION AND AT LEAST ONE SUBSTRATE, FOR FURTHER PROCESSING FOR FORGERY-PROOF DOCUMENTS

CROSS-REFERENCES TO RELATED APPLICATIONS

Not applicable.

STATEMENT REGARDING FEDERALLY SPONSORED RESEARCH OR DEVELOPMENT

Not applicable.

BACKGROUND OF THE INVENTION

The invention relates to a process and an apparatus for producing a laminate, comprising at least one polymer film with information and at least one substrate, for further processing for forgery-proof documents according to the precharacterizing clauses of Claim 1.

TECHNICAL FIELD

DE 29 52 322 discloses a process for producing forgery-proof documents, such as a personal identity card for example. An information carrier of paper is laminated with films on both sides, the films being respectively provided with a bonding layer, which consists of a radiation-curable composition and is laminated onto the information carrier in such a way that the layers come into contact with the information carrier, and the laminate is exposed to a crosslinking-active radiation. For laminating the film bearing the radiation-curable composition onto the surface of the information carrier, the film is heated to up to 1500° C. At the same time, the film is pressed against the surface of the information carrier. Once laminated onto the information carrier, the film can no longer be removed without completely destroying the information carrier.

The requirements for the production and provision of forgery-proof documents have increased greatly. The use of polymer films with information, such as holograms or the like for example, is required more and more. By using polymer films with information as an additional feature of forgery-proof documents known, for example, from DE 29 52 322, the effort required for forging such documents, and the degree of difficulty involved, can be increased significantly.

The polymer films with information, such as holograms for example, are extremely thin and sensitive films, which after their production are provided with a protective film or supporting film on both sides. The production of such a polymer film is disclosed for example by EP 0 726 142 A3.

For the further processing of such a laminate, comprising a polymer film which has a supporting film on both sides, it is required that the supporting films are pulled off from the polymer film, the polymer film subsequently having to be applied to substrates in order that they can be further processed, for example into forgery-proof documents according to DE 29 52 322. The supporting films surrounding the polymer film are produced from polyester films or polyethylene terephthalate films or the like, which are formed in such a way that, on the one hand, they are very thin and, on the other hand, they are transparent, preferably crystal clear, in order that the hologram or other information can be applied to the polymer film by means of a laser. Such supporting films are not suitable, however, for further processing into forgery-proof documents. These films have too high a melting point for further processing, meaning that the polymer film bearing the information would be adversely affected. Furthermore, high expenditure on apparatus is required for the further processing of films at a high temperature.

SUMMARY OF THE INVENTION

The invention is therefore based on the object of providing a process and an apparatus for producing a laminate, comprising at least one polymer film with information and at least one substrate, for further processing for forgery-proof documents, in which the supporting films of the polymer films are replaced in a continuous working cycle by substrates, so that a new laminate which is suitable for further processing for forgery-proof documents is created.

This object is achieved according to the invention by the process according to Claim 1.

By arranging at least a first processing station and a second processing station one behind the other, it is possible to create an in-line process in which at least one supporting film of the polymer film on one side is replaced by at least one substrate in a first processing station, and, on the opposite side of the polymer film, a supporting film is replaced by at least one substrate in a second processing station, the polymer film being conveyed continuously through the first and second processing stations. By exchanging the supporting films for substrates, it is possible to produce a laminate of a polymer film with substrates arranged on both sides which can be used for further processing for forgery-proof documents.

The smooth exchange of the supporting film for the substrate in a first processing station takes place by firstly the supporting film being delaminated and subsequently the substrate being laminated onto the polymer film by an adhesive and then exposed to a UV radiation for crosslinkage, so that a UV-curable adhesive bond is created between the polymer film and the substrate. This laminate, comprising supporting film, polymer film and substrate, is preferably fed directly to a second processing station, in order to delaminate the supporting film and subsequently laminate at least one substrate by an adhesive, the substrate then again being exposed to a crosslinking-active UV radiation. A laminate suitable for further processing, comprising a polymer film, preferably with holograms, and at least one substrate on both sides, can subsequently be led out from the second processing station.

According to an advantageous development of the invention, it is provided that, after the second processing station, the laminate is wound up on a winding-up roll or is further processed in a following working step. In particular during the further processing or prior performance of the re-laminating process according to the invention for the further processing of the film, an efficient production of forgery-proof documents can be provided. The triplex laminate produced by the process, comprising a polymer film with substrates arranged on both sides, can be applied, for example, to an information carrier which is used for the production of forgery-proof documents by a process according to DE 29 52 322.

According to a further advantageous development of the invention, it is provided that a film comprising the polymer film, preferably made up of three plies, is drawn off from at least one supply roll. As a result, the process can be used autonomously, in particular whenever the laminate produced at the end of the process is taken up by a winding-up roll. Alternatively, the process according to the invention may also be incorporated in a continuous process. The film comprising the polymer film may be provided by a processing station arranged upstream of this process and be supplied continuously.

According to at least one further advantageous development of the invention, it is provided that the at least first and second processing stations in each case have a central roller, on the outer circumference of which at least one delaminating device, at least one laminating device and at least one curing device are positioned. This can achieve the effect that the substrate is applied to the polymer film and supporting film in the first processing station, and to the polymer film and substrate in the second processing station, without any tension. Furthermore, an arrangement which saves installation space can be created in this way. Furthermore, it is advantageously provided that the delaminating device and laminating device are positioned directly following one another, so that the risk of contamination of the free surface of the polymer film between the delaminating device and the laminating device is kept low. In addition, as a result, the curing device can extend over a greater segment of a circle along the roller, advantageously achieving the effect that an undetachable bond between the laminated-on substrate and the polymer film is established at least before reaching the second processing station or before the winding up or further processing after the second processing station.

According to an advantageous development of the invention, it is provided that a polyethylene film is used as the substrate. This is suitable in particular for further processing.

According to a further advantageous development of the invention, it is provided that the substrate is subjected to a corona treatment. This allows a better crosslinkage of the adhesive with the substrates to be achieved.

According to a further advantageous development of the invention, it is provided that a first and second supply roll are used for providing the polymer film with supporting films and a splicing device is arranged downstream of the supply rolls, so that, after the film from the first supply roll has been used up, the end of the film can be joined to the film of the further supply roll with a butt joint for continuous processing. This allows the effectiveness to be increased and a continuous re-lamination of the polymer film from supporting films to substrates to take place. This splicing device is advantageously followed downstream by a material store, from which film is taken while the supply rolls are being changed over.

Also provided is an apparatus according to the invention, for producing a laminate, comprising a polymer film with information and at least one substrate, in particular for carrying out the process according to the invention, in which apparatus a film, comprising a polymer film and supporting films arranged on both sides, can be fed to a first processing station with at least one delaminating device, at least one laminating device and at least one curing device, and at least a second processing station is arranged downstream, corresponding at least to the construction of the first processing station. By arranging the first and at least second processing station one behind the other, a continuous exchange of the supporting films located on both sides of the polymer film for substrates can take place. The continuous lamination and delamination of the supporting film and substrate in a first and second processing station allows the same preconditions for applying the substrate to the polymer film to exist on account of the essentially identical processing parameters, so that the polymer film is accommodated between the substrates virtually without any tension.

The further advantageous developments of the apparatus are specified in the further claims.

BRIEF DESCRIPTION OF THE DRAWINGS

Preferred exemplary embodiments are described in more detail in the following drawings, in which.

DETAILED DESCRIPTION OF THE INVENTION

Figure 1:
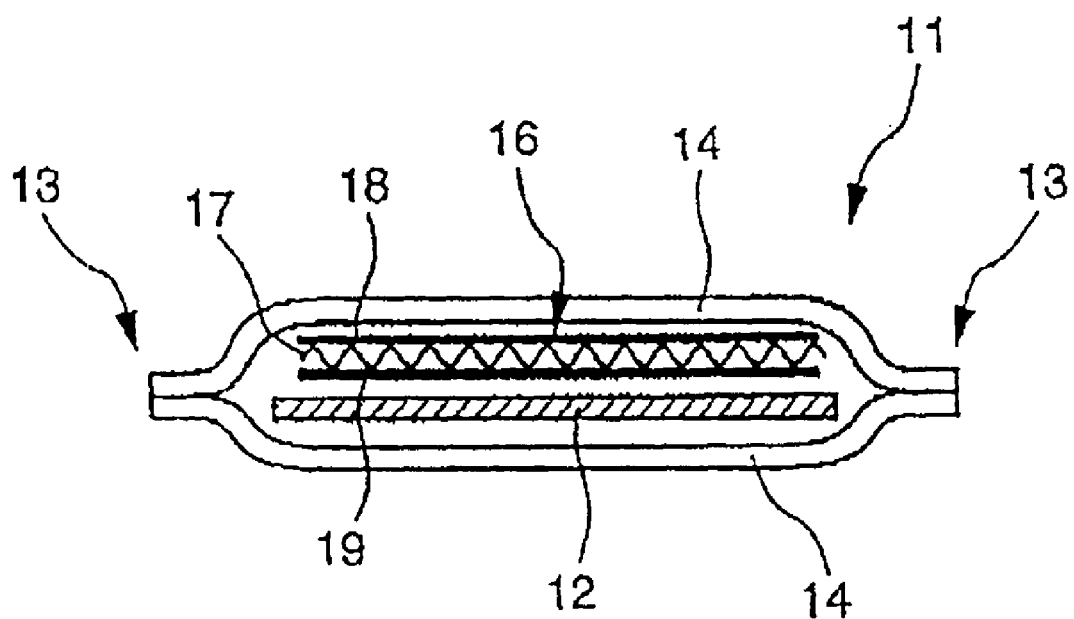
FIG. 1 shows a schematic cross section of a forgery-proof document with a laminate produced according to the invention.

The polymer film 17 is, for example, a photo-polymer film, which is provided with information. For example, a hologram and further photographic or other information may be applied. This information may be an interrogation mark, in order to position the hologram at a defined position on the information carrier 12, this mark being sensed by means of a sensor. Furthermore, an exposed film, which is used for web edge control to be described in more detail below, may be provided.

Similarly, the polymer film may store information as a magnetic strip.

The substrates 18, 19 are advantageously formed from polyethylene film. Other materials which satisfy the requirements which the substrates have to meet are similarly conceivable.

The laminate 16, which is preferably designed in the form of a triplex laminate, is applied to the information carrier 12 before the welding of the films 14. The welding of the films 14 to the information carrier 12 has the effect that the laminate 16 is at the same time laminated in such a way that a bond which can no longer be detached without complete destruction can likewise be established between the substrate 18 and the film 14 and between the substrate 19 and the information carrier 12.

That arrangement of the laminate 16 in the document 11 which is represented in FIG. 1 is only by way of example. The laminate 16 may similarly be intended for credit cards, documents for cashless payment transactions, factory identity cards, voter cards, national insurance cards or further identification cards or identity cards. The laminate 16 may similarly comprise more than three layers, the apparatus described below similarly making this object possible by a corresponding adaptation of the number of devices to the layers to be delaminated from and laminated to the polymer film 17.

Figure 2:
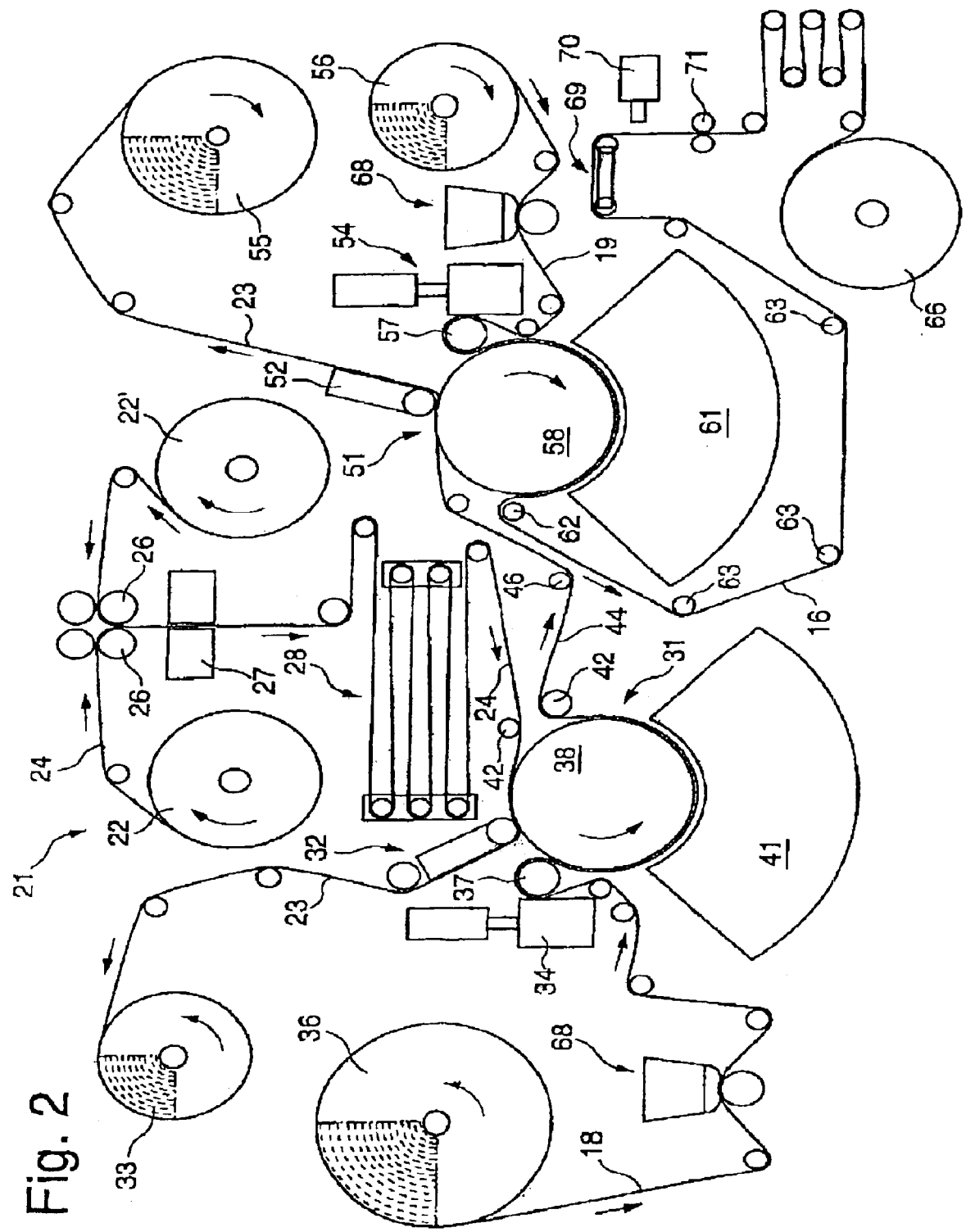
FIG. 2 shows a schematic side view of the apparatus according to the invention for carrying out the process, and In FIG. 1, a cross section of a forgery-proof document 11, for example a personal identity card, is schematically represented. This document 11 has an information carrier 12, preferably of printed paper or the like, which is surrounded by films 14 which are completely welded together all around in the edge region 13. Provided between the information carrier 12 and the film 14 is for example a laminate 16 produced according to the invention. This laminate 16 has a polymer film 17, which is laminated on both sides by a first substrate 18 and second substrate 19.

In FIG. 2, a construction of the apparatus 21 according to the invention for carrying out the process according to the invention is represented by way of example. A film 24, comprising a polymer film 17 with a supporting film 23 arranged on both sides, is provided on a first supply roll 22. This film 24 is drawn off from the supply roll 22 and led through a splicing device 27 via a deflecting roller 26. Provided downstream of that is a storage device 28, which has a plurality of deflecting points. At the end of the storage device 28, the film 24 is fed to a first processing station 31.

The first processing station 31 has a delaminating device 32, by which the supporting film 23 is detached from the polymer film 17. The supporting film 23 is led away out of the processing station 31 and stored on a winding-up roll 33. Arranged downstream of the delaminating device 32 is a laminating device 34. A first substrate 18 is drawn off from a supply roll 36 and fed to the laminating device 34. During the feeding of the substrate 18, at the same time a layer of adhesive is applied to the substrate 18 or polymer film 17. By means of at least one pressing roller 37, the first substrate 18 is pressed without any folds and without any air bubbles or the like onto the polymer film 17, which is transported by a roller 38 through the first processing station 31. Arranged downstream of the laminating device 34 is a curing device 41. The layer of adhesive provided between the polymer film 17 and the laminated-on first substrate 18 is cured by a UV radiation in the curing device 41, so that an undetachable bond is created, so that the polymer film 17 cannot be removed from the substrate 18 without complete destruction.

In addition to the undetachable bond, the use of UV-crosslinkable adhesive systems also has the advantage that rapid curing is made possible, so that the laminate 44 leaving the first processing station 31, comprising a supporting film 23, a polymer film 17 and a first substrate 18, forms a solidly bonded laminate at least between the polymer film 17 and the substrate 18. This laminate 44 is fed to a second processing station 51 via at least one deflecting roller 46. The laminate 44 is led through the second processing station 51 via a roller 58.

The second processing station 51 corresponds in construction to the first processing station 31, the second processing station 51 being arranged mirror-invertedly with respect to the first processing station 31. This makes it possible for the supporting films 23 to be replaced by a first substrate 18 and second substrate 19 one after the other in a continuous working sequence merely by reversing the direction of rotation of the roller 58 with respect to the roller 38. The protective film 23 is detached from the laminate 44 by means of a delaminating device 52 and stored on a winding-up roll 55. Arranged downstream of the delaminating device 52 is a laminating device 54, which, by analogy with the laminating device 34, draws off a second substrate 19 from a supply roll 56 and laminates it onto the polymer film 17 by means of at least one pressing roller 57. The laminate 16 produced as a result is fed to a curing device 61, which corresponds to the curing device 41. After running through the curing device 61 via deflecting rollers 63, the laminate 16 is led out from the second processing station 51.

In the exemplary embodiment according to FIG. 2, the laminate 16 produced according to the invention is led over a web edge control 69, which senses a line created by exposure on the photo-polymer film 17 by means of a line camera 70 and is fed at a speed of +/−0.1 mm to a cutting mechanism 71, in which the two edges of the laminate are cut off, so that the laminate 16 is cut to a precisely defined width. The control by means of the line created by exposure is very important for the further processing, since the information created by exposure on the photo-polymer film 17 must be exactly positioned with respect to the edge of the laminate for the further processing.

The laminate 16 cut to a defined width is wound up and stored on a supply roll 66 via a storage device 72, which has a plurality of deflecting points.

A reversing roller is advantageously provided, so that an empty core is always ready for the winding up of the laminate 16. Furthermore, it may alternatively be provided that the laminate 16 is passed on to a downstream station for the further processing of the laminate 16 and the production of forgery-proof documents.

The delaminating device 32, 52 and laminating device 34, 54 in the first and second processing stations 31, 51 are advantageously arranged directly alongside one another, so that, with guide rollers 42, 62 providing a wraparound of at least three-quarters of the roller 38, 58, an adequately large circumferential portion remains for the curing device 41, 61. The guide rollers 42, 62 are advantageously adjustable, so that the angle of wrap of the rollers 38, 58 is adjustable and can be adapted to corresponding applications.

The supply roll 22' may be provided mirror-invertedly with respect to the supply roll 22, so that a supply roll making the film 24 available is provided on both sides of the splicing device 27. This can make it possible, for example after the supply roll 22 has been used up, for a changeover to feeding the film 24 from the supply roll 22' to take place. Since the splicing device 27 requires a standstill for joining the end of the film 24 of the supply roll 22 to the beginning of the film of the supply roll 22' with a butt joint, the film 24 is in the meantime drawn off from the storage device 28. Once the butt joint has been produced, the film 24 is drawn off at the beginning of the supply roll 22' with increased speed in comparison with the processing speeds of the first and second processing stations 31, 51, in order that the storage device 28 can be filled up again.

Between the supply roll 36, 56 of the first and second substrates 18, 19 and the laminating device 34, 54 there may respectively be provided a corona station 68, in order to spray the first and second substrates 18, 19 with electrons to improve the surface tension and consequently the adhesive bonding.

Depending on the form taken by the laminate 16, a further delaminating and/or laminating station may optionally be provided in the first processing station and in the second processing station between the delaminating device 32, 52 and laminating device 35, 54, in order if appropriate to detach or incorporate a further film or the like between the polymer film 17 and the substrate 18 and/or 19. In this case, the rollers 38, 58 may be formed with a larger diameter, so as to allow a corresponding arrangement of the devices in series in a station.

The continuous process provided by the apparatus according to the invention allows working speeds of at least 25 m/min. to be achieved. Reliable processing of the polymer film 17, between 5 and 50 $\mu$m thick for example, can be made possible by this in-line process. The delamination of the supporting films 23 and lamination of the substrates 18, 19 may be assisted by slight thermal action. Furthermore, the UV-crosslinkable adhesive system is designed in such a way that the laminated-on substrates 18, 19 are essentially crosslinked completely with respect to the polymer film 17 after leaving the curing device 41, 61.

The designation polymer film 17 similarly stands for other information carriers which have an extremely thin layer thickness and are suitable for receiving information, and, for the further processing into forgery-proof documents, it is required that a substrate is provided at least on both sides. These substrates 18, 19 are, for example, polyethylene layers which are transparent at least after the completion of the forgery-proof documents. Alternatively, it may also be provided that only one of the two substrates 18, 19 is of a transparent form.

What is claimed is:

1. In a process for producing a forgery proof document comprising applying laminate (16) to an information carrier (12) followed by welding films (14) to enclose the laminate and the information carrier, the laminate is formed through a process in which a film (24), comprises at least one polymer film (17) with supporting films (23) arranged at least on both sides, is fed to a first processing station (31), and, in the first processing station (31), at least one supporting film (23) is delaminated on a first side of the polymer film (17), after which at least one substrate (18) is laminated on by an adhesive and subsequently exposed to a crosslinking-active UV radiation and in which a laminate (44) comprising at least one polymer film (17), at least one supporting film (23) on one side, and at least one substrate (18) on the other side of the polymer film (17) led out from the first processing station (31) is fed to a second processing station (51), and at least one supporting film (23) on the other side of the at least one polymer film (17) is delaminated of the laminate (44), and at least one substrate (19) is laminated on the other side to the at least one polymer film (17) by an adhesive and subsequently exposed to a crosslinking-active UV radiation.

2. Process according to claim 1, characterized in that the laminate (16) is led out from the second processing station (51) and wound up on a supply roll (66) or is fed to a downstream processing station.

3. Process according to claim 1, characterized in that a film (24), comprising a polymer film (17) with information and supporting films (23) arranged on both sides, is drawn off from at least one supply roll (22) or from a prior processing device and is fed to a first processing station (31).

4. Processing according to claim 1, characterized in that the first and second processing stations (31, 51) have a roller (38, 58), on the circumference of which there are positioned in each case at least one delaminating device (32, 52), at least one laminating device (34, 54) and at least one curing device (41, 61).

5. Processing according to claim 4, characterized in that the roller (38, 58) of the first and second processing stations (31, 51) is wrapped around by the laminate (44) and the laminate (16) by at least 180°, preferably 270°.

6. Process according to claim 1, characterized in that the adhesive between the first substrate (18) and the polymer film (17) is cured by a curing device (41) at least before reaching the second processing station (51).

7. Process according to claim 1, characterized in that a polyethylene film is used as the substrate (18, 19).

8. Process according to claim 1, characterized in that the substrate (18, 19) is subjected to a corona treatment.

9. Process according to claim 1, characterized in that a photo-polymer film, which is at least partially exposed and provided with holograms, is used as the polymer film (17).

10. Process according to claim 1, characterized in that a first and a second supply roll (22, 22') is used and arranged downstream is a splicing device (27), by which, after one supply roll (22, 22') has been used up, the film (24) of the further supply roll (22, 22') is joined with a butt joint for the continuous processing.

11. Process according to claim 10, characterized in that a storage device (28), from which film is taken while the supply rolls (22, 22') are being changed over, is provided between the supply roll (22, 22') and the first processing station (31).

* * * * *